United States Patent Office 3,524,106
Patented Aug. 11, 1970

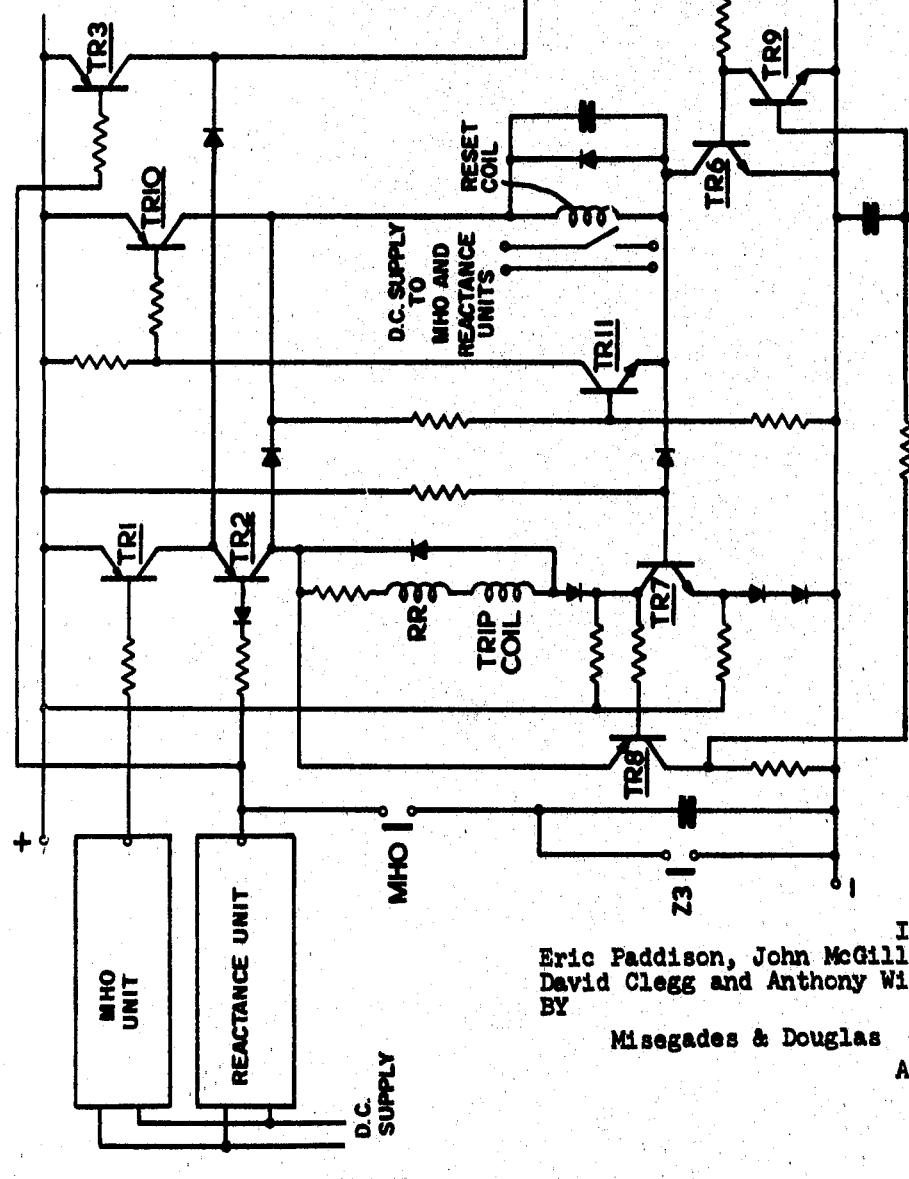

3,524,106
ELECTRICAL PROTECTIVE RELAY CIRCUITS
Eric Paddison, John McGill Gillies, David Clegg, and Anthony Williams, Stafford, England, assignors to The English Electric Company Limited, London, England, a British company
Filed Oct. 16, 1967, Ser. No. 675,669
Int. Cl. H02h 7/26, 3/28
U.S. Cl. 317—27      8 Claims

ABSTRACT OF THE DISCLOSURE

The object of this invention is to prevent malfunction, under certain conditions, of relays having a composite operating characteristic. These conditions are those which give rise to a "race" between, for example, two relay units having two different operating characteristics, e.g., mho and reactance, resetting and operating, since in some circumstances one unit may have had insufficient time to reset before the other unit has operated and vice versa.

The relay circuit has a number of inputs for respectively receiving signals dependent on different operating characteristics, e.g., mho and reactance. In particular, it includes a like number of switching devices connected to corresponding ones of these inputs and operable upon the signals being received within a predetermined time period to actuate a circuit breaker. This period is determined by a timer and is initiated on receipt of the first one of these signals, the timer being operable to inhibit the operation of the breaker in the absence of any one of the remaining signals within this period. A reset coil temporarily interrupts all the signals applied to the inputs upon receipt of any one of these signals after the period having elapsed.

The receipt of all the signals within the said period may be indicative of a fault in the first zone of protection and one of the input signals representative, for example, of a mho operating characteristic, may actuate a further timer (not shown) to cover the second zone, the period covered by this latter timer being greater than the "predetermined" time period.

---

This invention relates to electrical protective relay circuits and more particularly relates to a circuit designed to avoid malfunction, under certain conditions, of relays which have a composite operating characteristic derived from a combination of at least two different characteristics, e.g., mho and reactance.

From one aspect, the present invention consists in a protective relay circuit for an electrical system, the circuit having a plurality of inputs for respectively receiving signals from fault measuring units defining different operating characteristics, a like plurality of switching devices connected to corresponding ones of said inputs and operable in response to said signals being received thereby within a predetermined time period to actuate means for effecting a protective function, the period being determined by a timer and initiated on receipt of the first one of said signals, the timer being operable to inhibit the operation of the protective means in the absence of any one of the remaining signals within said period, and reset means for temporarily interrupting all the signals applied to the inputs upon receipt of any one of the signals after said period having elapsed.

The receipt of all the signals within said time period may be indicative of a fault in a first zone (zone 1) of protection in said system, and one of the input signals representative, for example, of a "mho" operating characteristic, may be operative to actuate a further timer to cover a second zone (zone 2), the duration of this timer being greater than the aforesaid time period.

An additional timer may also be actuated by this signal to cover a further zone (zone 3).

At the expiration of zone 2 time the operating characteristics on which the other signals depend may be modified so that the resultant characteristic embraces zone 2 faults, and at the expiration of zone 3 time a signal simulating these remaining signals may be applied to their corresponding inputs.

As mentioned above, an object of this invention is to prevent malfunction of relays having a composite operating characteristic under certain conditions. These conditions are those which give rise to a "race" between, for example, two relay units having two different operating characteristics, e.g., mho and reactance, resetting and operating, since in some circumstances one unit may have had insufficient time to reset before the other unit has operated and vice versa.

An example of such circumstances is given below with reference to FIG. 2 in the accompanying drawings.

In order that this invention may be fully understood, one embodiment thereof will now be described, by way of example, with reference to these accompanying drawings, in which:

FIG. 1 illustrates a circuit diagram of a circuit according to this invention; and FIG. 2 illustrates a composite operating characteristic on an impedance plane X, R derived from mho and reactance relay units.

Referring now to FIG. 1, with an input from the mho unit only, transistor TR1 conducts and causes capacitor C1 in a timing unit to charge through resistor R1. The time constant of this CR circuit is such that transistor TR4 is switched-on after a predetermined period, e.g., 60 milliseconds, which in turn, switches-on transistor TR5, and thus TR6 also. With transistor TR6 switched-on, the base of transistor TR7 is held at the -ve supply potential, thus inhibiting the trip coil from being energised.

If an additional input is now applied from the reactance unit, then transistor TR2 is switched-on, the reset coil is energised, transistor TR11 is switched-on and this causes transistor TR10 to be switched-on so as to seal-in the reset coil. Under these conditions both the mho and the reactance units will reset.

If however, an input from the reactance unit is applied before the expiration of the timing period, then transistor TR2 is switched-on and, since transistor TR7 is biassed-on, the trip coil will be energised so as to trip the protective breaker (not shown). With the trip coil energised, transistor TR8 is switched-on, thus switching-on transistor TR9 and ensuring that transistor TR6 cannot be switched-on at the expiration of the timing period which would otherwise cause transistor TR7 to be switched-off and deenergise the trip coil.

The same considerations apply should an input be applied from only the reactance unit, transistor TR3 being switched-on in this instance to start the timing unit.

With input applied simultaneously from both the mho and the reactance units, then transistors TR1 and TR2 will be switched-on, and with TR7 biassed-on the trip coil will be energised and interlocked as before.

Accordingly, if a trip signal is being given, then the trip coil is energised and the reset circuit is blocked and if a reset signal is being given, then the reset coil is energised and the trip circuit is blocked. Upon reset, both the mho and reactance units are reset by removal of their D.C. supply, and this will result in the inputs to transistors TR1 and TR2 being removed and the reset coil being deenergised.

The reset coil will remain deenergised if the fault has been isolated by another protective breaker, but if the fault still remains, then the mho and reactance units will both operate simultaneously and accordingly energise the trip coil.

When the mho unit is operative, a zone 2 timer is started, the period of this timer being greater than that of the timing unit, and the "mho" contact shown in FIG. 1 is closed whenever this mho unit is operative. This zone 2 timer extends the reach of the reactance unit and is stopped upon the trip coil being energised by means (not shown) coupled to the reed relay RR connected in series with the trip coil. A zone 3 timer is also started by the mho unit and at the expiration of this timing period contact Z3 is closed so as to apply a signal to the reactance input.

The operation of the zone 2 and zone 3 timer in response to such a "mho" signal is well known and accordingly the relevant circuitry will not be shown here, however, reference may be made to chapter 5 in "Protective Relays," volume 1, by A. R. van C. Warrington and published by Chapman and Hall, which shows some examples of the general layout of such a scheme.

More particularly, describing the operation with regard to a particular set of circumstances, assume firstly that under normal load conditions the load point in a power line is at A in the impedance characteristic diagram shown in FIG. 2, that is, it is lying within the zone 1 reactance characteristics (XI) but outside the mho directional characteristic. Under these circumstances the trip coil is inhibited from being energised.

Should a fault now occur at position B, i.e., in zone 1 of the composite characteristic then an input will be present from the mho unit, the reset coil will be energised and, after reset, both the mho and reactance units will operate and trip the breaker.

Similarly, should the fault occur at position C, that is, outside the zone 1 reactance characteristic and in zone 2 of the composite characteristic the reset coil will again be energised but subsequently only the mho input will be present and the trip coil will be inhibited from energisation. At the expiry of zone 2 time an input is additionally applied from the reactance unit and both the mho and reactance units will operate and trip the breaker after having first been reset, the zone 2 timer being "sealed-in" to ensure that this zone is correctly covered whilst this reset and remeasure sequence takes place.

Should the fault occur at position D, that is, in zone 3 where only the mho unit is operative, the trip coil will be inhibited from operation again until the expiry of zone 3 time at which instant the contact Z3 is closed whereby to apply a trip signal to the reactance input (the "mho" contact being closed). The mho unit is then reset and upon its subsequent operation its input is coincident with that at the reactance input and the trip coil is energised.

Conversely, after clearance of these faults at positions B, C or D the line returns to its normal load point at position A. The faults occurring at positions C and D of course, may have been cleared by other breakers in adjacent sections since they are outside zone 1 of this relay characteristic, and in this event upon the line returning to normal this scheme ensures that there is no possibility of this relay operating and incorrectly tripping its breaker since, in the event of an input being applied from the reactance unit (position A being in zone 1 of the reactance characteristic) before the input from the mho unit has ceased, both the mho and reactance units will be positively reset, thus avoiding the contact "race" which could otherwise occur under the circumstances. Similarly, upon the occurrence of the fault at positions C or D there is again no possibility of the relay operating incorrectly as a result of contact "race" since in the event of an input now being applied from the mho unit in addition to the reactance input (position A) both the mho and reactance units will be positively reset, thus avoiding the possibility of a zone 2 or zone 3 fault for this relay causing its breaker to be tripped as if it were within its zone 1.

Another condition postulated is that in which the normal load point is at position E in FIG. 2 in which contact "race" is avoided as before. In addition, however, in this particular instance, if a fault occurs at position B an input will immediately be applied from both the mho and the reactance units and the trip coil will be energized in the time taken for the slowest of these units to operate. Operation under these circumstances will be faster than the case in which the normal load point is at A, as mentioned above, and a fault occurs at B, since there is no reset and remeasure sequence. The operation of the circuit with its load point at this position E and a fault at positions C or D is the same as before.

It is to be understood that although this invention has been described with reference to a composite characteristic derived from mho and reactance relay units the invention is equally applicable with such characteristics derived from relay units dependent on other quantities, e.g., ohm, impedance, directional impedance, directional overcurrent, etc.

Furthermore, the invention is not restricted to the provision of two relay units and three or more may conveniently be accommodated in which case three or more transistors will be connected in series with the trip coil in the manner of TR1 and TR2, any one of these transistors being operable to actuate the timer as before.

We claim:
1. A protective relay circuit comprising
 means for effecting a protective function,
 a plurality of inputs for respectively receiving signals from fault measuring units defining different operating characteristics,
 a plurality of switching devices connected to corresponding ones of said inputs and each having open and closed positions, and
 a timer, the switching devices being operable in response to all said signals being received thereby within a predetermined time period to operate the protective means, the period being determined by the timer and initiated on receipt of the first one of said signals and the timer being operative to inhibit the operation of the protective means in the absence of any one of the remaining signals, and
 reset means for temporarily interrupting all of the signals applied to the inputs upon receipt of any one of the remaining signals after said period having elapsed.
2. A protective relay according to claim 1, comprising
 a tripping circuit for the protective means, and
 first and second additional switches having open and closed positions, the first switch together with the tripping circuit and the switching devices being connected in series across a supply source, the timer being operable to inhibit the energisation of the tripping circuit by operating the second switch whereby to open the first switch.
3. A protective relay circuit comprising
 means for effecting a protective function,
 a tripping circuit for the protective means,
 a plurality of inputs for respectively receiving signals from fault measuring units defining different operating characteristics,
 a plurality of switching devices connected to corresponding ones of said inputs and each having open and closed positions,
 first and second additional switches having open and closed positions, the first switch being normally closed and connected in series across a supply source with the tripping circuit and the switching devices,
 a timer, the switching devices being closed in response to all said signals being received thereby within a predetermined time period to energise the tripping circuit, the period being determined by the timer and initiated on receipt of the first one of said signals, and the timer being operative to inhibit the energisation of the tripping circuit in the absence of any one of the remaining signals within said period by closing said second switch whereby to open the first switch, and reset means operable only after the elapse of said timing period temporarily to interrupt all the signals applied to the inputs, the reset means being operable upon receipt of the remaining signals after said period and comprising a reset coil connected in series with the switching devices and said second switch, the reset coil being energised in response to closure of all the switching devices together with closure of this second switch.

4. A circuit according to claim 3, wherein the tripping circuit is a trip coil, and comprising a third additional switch connected across the supply in series with the switching devices, the third switch being operable to inhibit closure of the second switch in response to energisation of the trip coil.

5. A circuit according to claim 4, comprising two of said switching devices, one being operable to receive an input from a measuring unit determining a mho characteristic and the other being operable to receive an input from a unit determining a reactance characteristic.

6. A circuit according to claim 5, comprising control means operable to extend the characteristic "reach" of the reactance unit following a first time interval exceeding the period determined by said timer.

7. A circuit according to claim 6, comprising further control means operable in response to an input to the switching device associated with the mho unit to simulate an input from the reactance unit to the other switching device following a second time interval exceeding the first whereby to cause the protective function to be executed in response to a fault occurring within the mho characteristic but outside the reactance characteristic.

8. A protective relay circuit comprising two input circuits for respectively receiving signals from measuring units determining mho and reactance operating characteristics, first and second transistor switches connected to corresponding ones of said input circuits, a trip coil for effecting a protective function, third and fourth transistor switches, said first, second and third switches being connected in series with said trip coil across a supply source, and a timer, actuation of the first and second transistor switches in response to said signals being received within a predetermined time period being operative to energise the trip coil and effect the protective function, the period being determined by the timer and initiated on receipt of the first one of the signals and the timer being operative to inhibit the energisation of the coil in the absence of any one of the remaining signals by actuating the fourth transistor switch whereby to deactuate the third switch, and a reset coil connected in series with the first, second and fourth switches and energisable temporarily to interrupt all the signals applied to the inputs upon receipt of any one of the remaining signals after said period having elapsed.

References Cited

UNITED STATES PATENTS 3,295,019  12/1966  Altfather _____ 317—27

LEE T. HIX, Primary Examiner

H. FENDELMAN, Asistant Examiner

U.S. Cl. X.R.

317—33, 36